(12) United States Patent
Choi

(10) Patent No.: US 8,228,460 B2
(45) Date of Patent: Jul. 24, 2012

(54) BACKLIGHT ASSEMBLY, LIQUID CRYSTAL DISPLAY HAVING THE SAME AND METHOD OF MANUFACTURING THE LIQUID CRYSTAL DISPLAY

(75) Inventor: Jae-Min Choi, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 535 days.

(21) Appl. No.: 12/432,178

(22) Filed: Apr. 29, 2009

(65) Prior Publication Data

US 2009/0273726 A1 Nov. 5, 2009

(30) Foreign Application Priority Data

Apr. 29, 2008 (KR) .......................... 10-2008-0040016

(51) Int. Cl.
*G02F 1/1333* (2006.01)
*G02F 1/1335* (2006.01)

(52) U.S. Cl. ........................................... 349/61; 349/58

(58) Field of Classification Search .............. 349/58–65; 362/97.1–97.4, 600–634

See application file for complete search history.

(56) References Cited

U.S. PATENT DOCUMENTS

| 2006/0279957 A1* | 12/2006 | Kwon et al. | 362/378 |
| 2007/0286629 A1* | 12/2007 | Kwon et al. | 399/69 |
| 2008/0079865 A1* | 4/2008 | Kang et al. | 349/61 |
| 2008/0211986 A1* | 9/2008 | Bae et al. | 349/60 |

FOREIGN PATENT DOCUMENTS

| KR | 1020060015868 | 2/2006 |
| KR | 1020060084018 | 7/2006 |
| KR | 1020060102227 | 9/2006 |

* cited by examiner

*Primary Examiner* — Mark Robinson
*Assistant Examiner* — Charles Chang
(74) *Attorney, Agent, or Firm* — Cantor Colburn LLP

(57) ABSTRACT

A backlight assembly includes a lamp which generates light, a lamp socket which receives the lamp, an alignment plate including a socket insertion hole formed therethrough to receive the lamp socket, and a receiving container including a cutout portion formed therethrough to receive the lamp socket. The receiving container is attached to the alignment plate which has the lamp socket inserted through the socket insertion hole, and a portion of the lamp socket is exposed outside the receiving container through the socket insertion hole when the receiving container is attached to the alignment plate.

24 Claims, 14 Drawing Sheets

BACKLIGHT ASSEMBLY, LIQUID CRYSTAL DISPLAY HAVING THE SAME AND METHOD OF MANUFACTURING THE LIQUID CRYSTAL DISPLAY

This application claims priority to Korean Patent Application No. 10-2008-0040016, filed on Apr. 29, 2008, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly, a liquid crystal display having the same, and a method of manufacturing the liquid crystal display, and more particularly, to a backlight assembly having a lamp socket with a substantially improved heat dissipation capability, a simplified assembling process thereof, and reduced noise from friction, a liquid crystal display having the backlight assembly, and a method of manufacturing the liquid crystal display.

2. Description of the Related Art

Recently, as society becomes increasingly information-oriented, market demand for slimmer and lighter panel displays has increased. However, conventional display devices, such as cathode ray tubes ("CRTs"), are not particularly well-suited to such demand. Accordingly, demand for flat display panel ("FDP") devices, such as a plasma display panel ("PDP") device, a plasma address liquid crystal ("PALC") display panel device, a liquid crystal display ("LCD") device, and an organic light emitting diode ("OLED") device, for example, has been rapidly increasing.

The LCD device is a commonly used flat panel display. The LCD typically includes two panels, each having electrodes thereon, and a liquid crystal layer interposed therebetween. A transmittance of light through the LCD is controlled by applying voltages to the electrodes to rearrange an alignment of liquid crystal molecules of the liquid crystal layer.

The LCD is a passive light-emitting device, and therefore includes an LCD panel for displaying an image and a backlight assembly for supplying the LCD panel with light. Examples of a light source used in the backlight assembly include a cold cathode fluorescent lamp ("CCFL") and a hot cathode fluorescent lamp ("HCFL"). To increase a manufacturing efficiency of the LCD, various components, such as the light source, for example, are often manufactured using automated equipment. However, it is difficult to automatically assemble some components, such as a lamp socket having adequate heat dissipation capabilities, for example.

Therefore, it is necessary to develop a structure enabling automated assembly of the LCD while facilitating dissipation of heat from a lamp socket after assembly.

BRIEF SUMMARY OF THE INVENTION

Exemplary embodiments of the present invention provide a backlight assembly having at least the advantages of a lamp socket with substantially improved heat dissipation capability, an effectively simplified assembling process thereof, and substantially reduced noise from friction.

Exemplary embodiments of the present invention also provides a liquid crystal display including the backlight assembly having the lamp socket with substantially improved heat dissipation capability, an effectively simplified assembling process, and reduced noise from friction.

Exemplary embodiments of the present invention also provide a method of manufacturing the liquid crystal display including the backlight assembly having the lamp socket with substantially improved heat dissipation capability, an effectively simplified assembling process, and reduced noise from friction.

According to an exemplary embodiment of the present invention, there is provided a backlight assembly including a lamp which generates light, a lamp socket which receives the lamp, an alignment plate including a socket insertion hole formed therethrough to receive the lamp socket, and a receiving container including a cutout portion formed therethrough to receive the alignment plate. The receiving container receives the alignment plate having the lamp socket inserted through the socket insertion hole. A portion of the lamp socket is exposed outside the receiving container through the socket insertion hole when the receiving container receives the alignment plate.

According to an alternative exemplary embodiment of the present invention, there is provided a liquid crystal display ("LCD") including an LCD panel which displays an image, a lamp which supplies the LCD panel with light, a lamp socket which receives the lamp, an alignment plate including a socket insertion hole formed therethrough to receive the lamp socket, and a receiving container including a cutout portion formed therethrough to receive the alignment plate. The receiving container receives the alignment plate having the lamp socket inserted through the socket insertion hole. A portion of the lamp socket is exposed outside the receiving container through the socket insertion hole when the receiving container receives the alignment plate According to another alternative exemplary embodiment of the present invention, there is provided a method of manufacturing a liquid crystal display including attaching a lamp socket to an alignment plate. The alignment plate includes a socket insertion hole formed therethrough to receive the lamp socket. The method further includes attaching the alignment plate, having the lamp socket attached thereto, to a receiving container. The receiving container includes a cutout portion formed therethrough to receive the alignment plate. A portion of the lamp socket is exposed outside the receiving container through the socket insertion hole when the receiving container receives the alignment plate.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
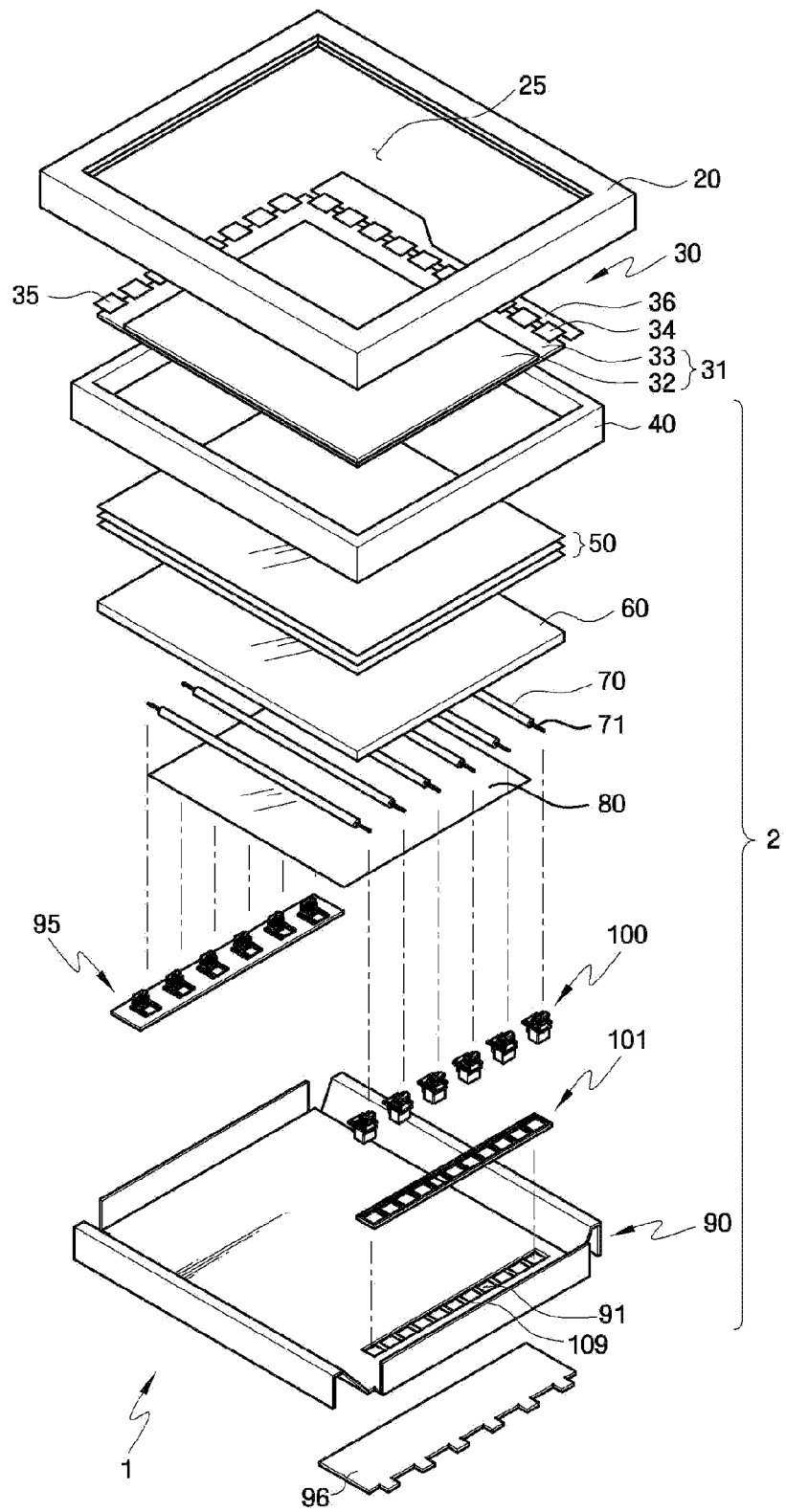
FIG. 1 is an exploded perspective view of a liquid crystal display ("LCD") according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, a liquid crystal display according to an exemplary embodiment of the present invention will be described in further detail with reference to FIG. 1. FIG. 1 is an exploded perspective view of a liquid crystal display ("LCD") according to an exemplary embodiment of the present invention.

Referring to FIG. 1, an LCD 1 according to an exemplary embodiment of the present invention includes an LCD panel assembly 30, an upper receiving container 20 and a backlight assembly 2.

The LCD panel assembly 30 according to an exemplary embodiment of the present invention includes an LCD panel 31 including a thin film transistor substrate 33, a common electrode substrate 32 and a liquid crystal layer (not shown) disposed therebetween. The LCD panel assembly 30 further includes a gate tape carrier package ("TCP") 35; a data tape carrier package 34; and an integrated printed circuit board ("PCB") 36.

The LCD panel 31 according to an exemplary embodiment includes the thin film transistor substrate 33, including gate lines (not shown), data lines (not shown), thin film transistor arrays (not shown), and pixel electrodes (not shown), and a common electrode substrate 32 including a black matrix (not shown) and a common electrode (not shown) disposed opposite to, e.g., facing, the thin film transistor substrate 33. The LCD panel 31 displays an image thereon.

The gate tape carrier package 35 is connected to each of the gate lines formed on the thin film transistor substrate 33, and the data tape carrier package 34 is connected to each of the data lines formed on the thin film transistor substrate 33. In an exemplary embodiment, the gate tape carrier package 35 and the data tape carrier package 34 include tape automated bonding ("TAB") tapes including wiring patterns formed on a base film, as well as semiconductor chips bonded to the wiring patterns using a TAB technique.

In an exemplary embodiment, driving components (not shown) for inputting a gate driving signal and a data driving signal, for example, to the integrated printed circuit board 36 and the gate data tape carrier package 34, respectively, are mounted on the gate tape carrier package 35.

As shown in FIG. 1, the upper receiving container 20 defines an outer periphery of the LCD 1 and has an aperture 25, e.g., a window 25, formed therein to receive the LCD panel assembly 30 and display the image therethrough. Thus, the window 25 is formed in a center portion of the upper receiving container 20 to expose the LCD panel 31 outside to a viewer outside the LCD 1.

In an exemplary embodiment, the upper receiving container 20 is combined with, e.g., is attached to, a lower receiving container 90 with an intermediate frame 40 interposed therebetween.

Still referring to FIG. 1, the backlight assembly 2 includes the intermediate frame 40, optical sheets 50, a diffusion plate 60, a lamp 70, a lamp socket 100, an alignment plate 101 and the lower receiving container 90.

The intermediate frame 40 accommodates the optical sheets 50, the diffusion plate 60, the lamp 70, the lamp socket 100 and the alignment plate 101. Further, the intermediate frame 40 is seated, e.g., is fixed, on the lower receiving container 90. The intermediate frame 40 includes sidewalls formed along a periphery of the intermediate frame 40, and has an aperture formed in a central area thereof to allow transmission of light from the lamp therethrough after the light passes through the diffusion plate 60 and the optical sheets 50.

The optical sheets 50 diffuse and/or concentrate the light received from the lamp 70 through the diffusion plate 60. The optical sheets 50 are disposed above the diffusion plate 60 and are accommodated inside the intermediate frame 40, as shown in FIG. 1. In an exemplary embodiment, the optical sheets 50 include a first prism sheet, a second prism sheet and a protective sheet, for example.

Specifically the first prism sheet and the second prism sheet may reflect the light which has passed through the diffusion plate 60, and may further concentrate the light, entering at a relatively low inclination angle (relative to a viewing angle of the LCD 1), toward a front of the LCD 1 to enhance a brightness of the LCD 1 within a given range of the viewing angle.

In addition, the protective sheet may be formed on the first prism sheet and the second prism sheet to protect a surface thereof and/or to diffuse the light to uniformly distribute the light thereon. It will be noted that the optical sheets 50 are not limited to the foregoing description, and alternative exemplary embodiments of the present invention may include various changes in the arrangement and/or function of the optical sheets 50.

The diffusion plate 60 diffuses the light emitted from a light source, e.g., the lamp 70, in multiple directions, and thus functions to effectively reduce the appearance of bright spots of the lamp 70 at front surface of the LCD 1.

In an exemplary embodiment of the present invention, the lamp 70 may include a cold cathode fluorescent lamp ("CCFL") or, alternatively, a hot cathode fluorescent lamp ("HCFL"), but alternative exemplary embodiments are not limited thereto.

In an exemplary embodiment which includes the HCFL, lamp terminals 71 are disposed at opposite ends of the lamp 70 along a longitudinal axis thereof. The lamp terminals 71 are inserted into the lamp socket 100 and a ground socket 95 supplied with electric power. As will be described in further detail below, the lamp socket 100 is inserted into the alignment plate 101 such that a portion thereof is exposed to a bottom surface of the lower receiving container 90 through a cutout portion 91 formed in the bottom surface of the lower receiving container 90. A reflecting sheet 80 is disposed below the lamps 70 and reflects light emitted downward from the lamps 70.

An inverter 96 is inserted into the lamp socket 100 exposed through the cutout portion 91. Thus, the inverter 96 which applies a driving voltage to the lamp 70 through the lamp socket 100 is disposed outside, e.g., external to, the lower receiving container 90, and is connected to, e.g., is attached to, the alignment plate 101 to then be inserted into a lower end of the lamp socket 100 exposed through the cutout portion 91. As a result, a size of the LCD 1 according to an exemplary embodiment is substantially reduced, e.g., the LCD 1 according to an exemplary embodiment is less bulky. In addition, the abovementioned configuration, described in greater detail below, allows heat generated at the lamp socket 100 to be effectively dissipated outside the LCD 1 according to an exemplary embodiment.

Figure 7:
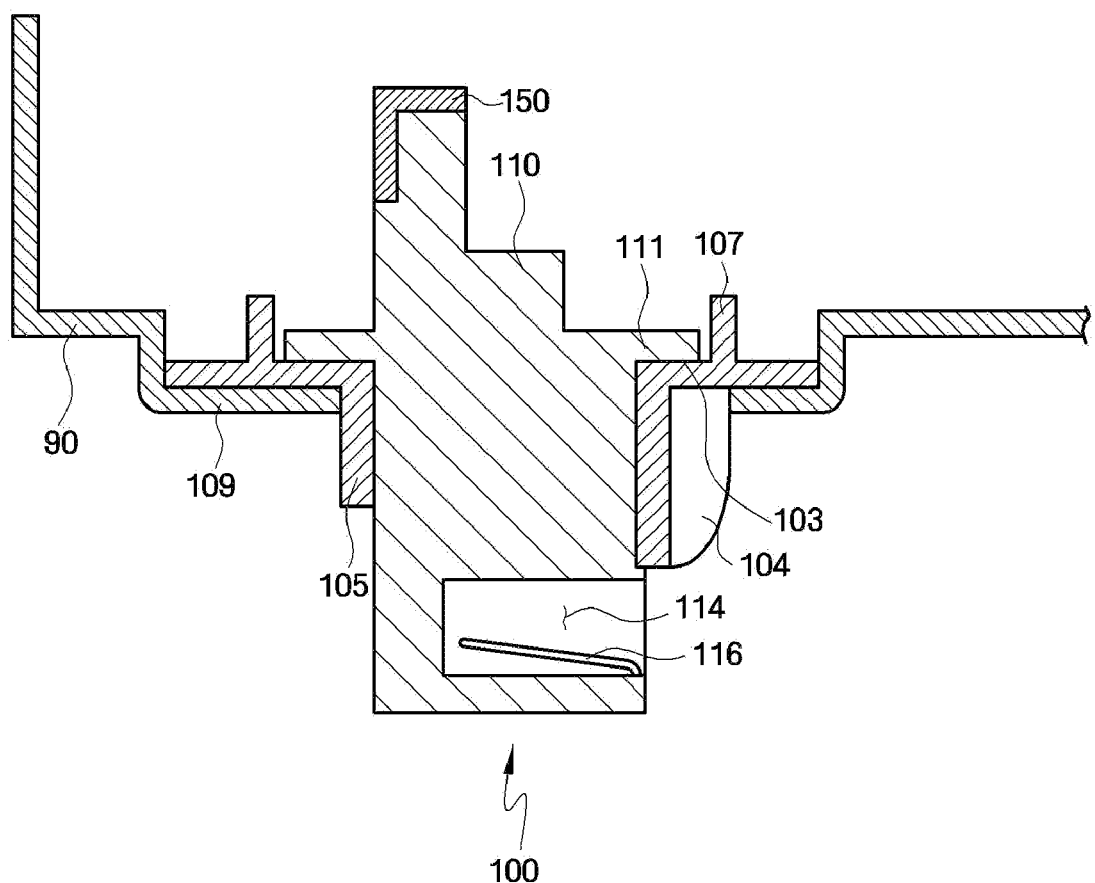
FIG. 7 is a partial cross-sectional view taken along line VII-VII' of FIG. 6.

Still referring to FIG. 1, the lower receiving container 90 according to an exemplary embodiment includes a recess portion 109, described in greater detail below, into which the alignment plate 101 is inserted. More specifically, the recess portion 109 is recessed downward from the lower receiving container 90, as best shown in FIG. 7, thereby reducing a height of the alignment plate 101 and the lamp socket 100 above the lower receiving container 90. Thus, the heights of the alignment plate 101 and the lamp socket 100 mounted on the lower receiving container 90 as substantially reduced, and a distance between a bottom surface of the lower receiving container 90 and the diffusion plate 60 is thereby reduced, thereby reducing an overall thickness of the LCD 1 according to an exemplary embodiment of the present invention.

In addition, the lamp socket 100 protrudes outward (with respect to the lower receiving container 90) by forming the recess portion 109, thereby providing a space for inserting the inverter 96 into the lamp socket 100, as will described in greater detail below.

Figure 2:
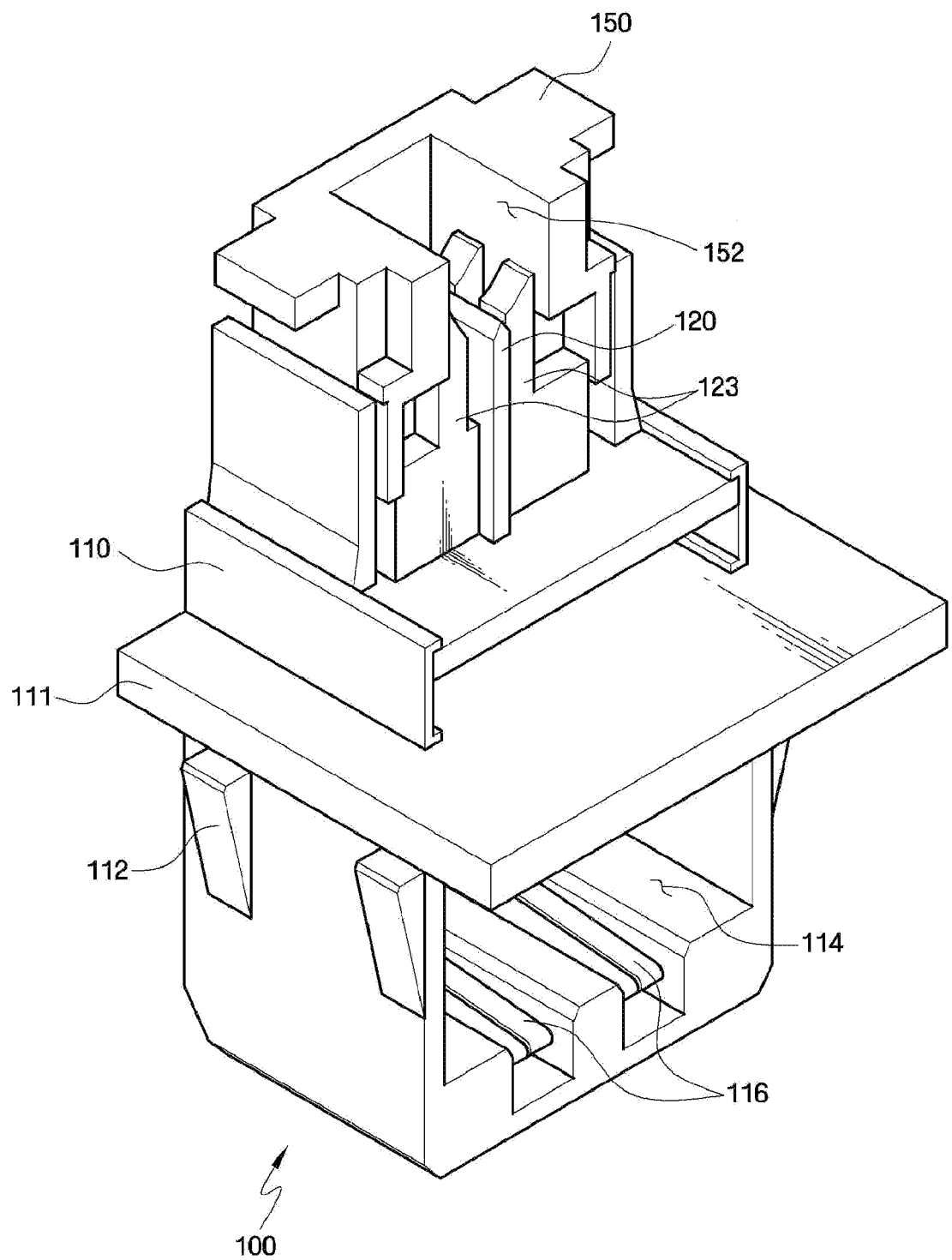
FIG. 2 is a perspective view of a lamp socket of the LCD according to the exemplary embodiment of the present invention shown in FIG. 1.

Hereinafter, the lamp socket 100 included in the LCD 1 according to an exemplary embodiment of the present invention will be described in further detail with reference to FIGS. 1 and 2. FIG. 2 is a perspective view of a lamp socket of the LCD according to the exemplary embodiment of the present invention shown in FIG. 1.

Referring to FIGS. 1 and 2, the lamp socket 100 securely fixes the lamp 70 and applies electric power to the lamp 70 is inserted into the alignment plate 101 to then be fixed to the lower receiving container 90 of the LCD 1. The lamp socket 100 includes a housing 110, a socket fixing portion 112, an inverter insertion hole 114, first connection terminals 126 (FIG. 9), second connection terminals 116, a guide member 120, a cover 150 and an opening 152.

In an exemplary embodiment, the lamp 70 is fixed to an upper portion of the housing 110, and the inverter 96 (FIG. 1) is inserted into a lower portion of the housing 110 to supply the driving voltage to the lamp 70. Lamp terminal insertion grooves 122 (FIG. 9) are disposed separated from each other by the guide member 120, and the lamp terminal insertion grooves 122 include the first connection terminals 126 connected to the lamp terminals 71 (FIG. 1).

Specifically, the first connection terminals 126 apply the driving voltage to the lamp 70 and are connected to the second connection terminals 116 disposed at the lower portion of the lamp socket 100. In an exemplary embodiment, the lamp 70 may be an HCFL, which includes terminals at each end thereof, as described above with reference to FIG. 1. More specifically, the lamp terminals 71 are inserted into the lamp terminal insertion grooves 122 and are thus connected to the first connection terminals 126. In an exemplary embodiment, the first connection terminals 126 have elasticity, and they thereby securely fix the lamp terminals 71 in the lamp terminal insertion grooves 126 to prevent movement of the lamp terminals 71 in the lamp terminal insertion grooves 122.

The second connection terminals 116 receive a driving voltage from the inverter 96 (FIG. 1) and supply the received driving voltage to the first connection terminals 126. Thus, the inverter 96 is inserted into the inverter insertion hole 114 formed at the lower portion of the lamp socket 100 shown in FIG. 2. Specifically, the inverter 96 slides into the lower portion of the lower receiving container 90 to then be inserted into the inverter insertion hole 114.

A flange 111 is disposed around a periphery of the lamp socket 100 between the lower portion of the lamp socket 100, exposed to the outside of the lower receiving container 90, and the upper portion of the lamp socket 100, which fixes the lamp 70 within the lower receiving container 90. Thus, the lamp socket 100 is attached to the alignment plate 101 with the socket fixing portion 112. In an exemplary embodiment, the socket fixing portion 112 is attached to the lower receiving container 90 by a hook coupling or, alternatively, a screw coupling method.

The lamp socket 100 includes the cover 150 at an upper end, e.g., a top, of the upper portion, and the lamp 70 is thereby effectively prevented from moving within the lamp socket 100. In an exemplary embodiment, the cover 150 may be connected to the upper end of the housing 110 by hook coupling or, alternatively, by hinge coupling. In an exemplary embodiment wherein the housing 110 is combined to the cover 150 by hinge coupling, the cover 150 is configured to be opened or closed by rotating the cover 150 about a hinge (not shown). It will be noted that the hook coupling and the hinge coupling are described herein only as an exemplary embodiment of coupling between the cover 150 and the housing 110, and, in alternative exemplary embodiments, the coupling between the cover 150 and the housing 110 may be achieved in various other ways.

Figure 9:
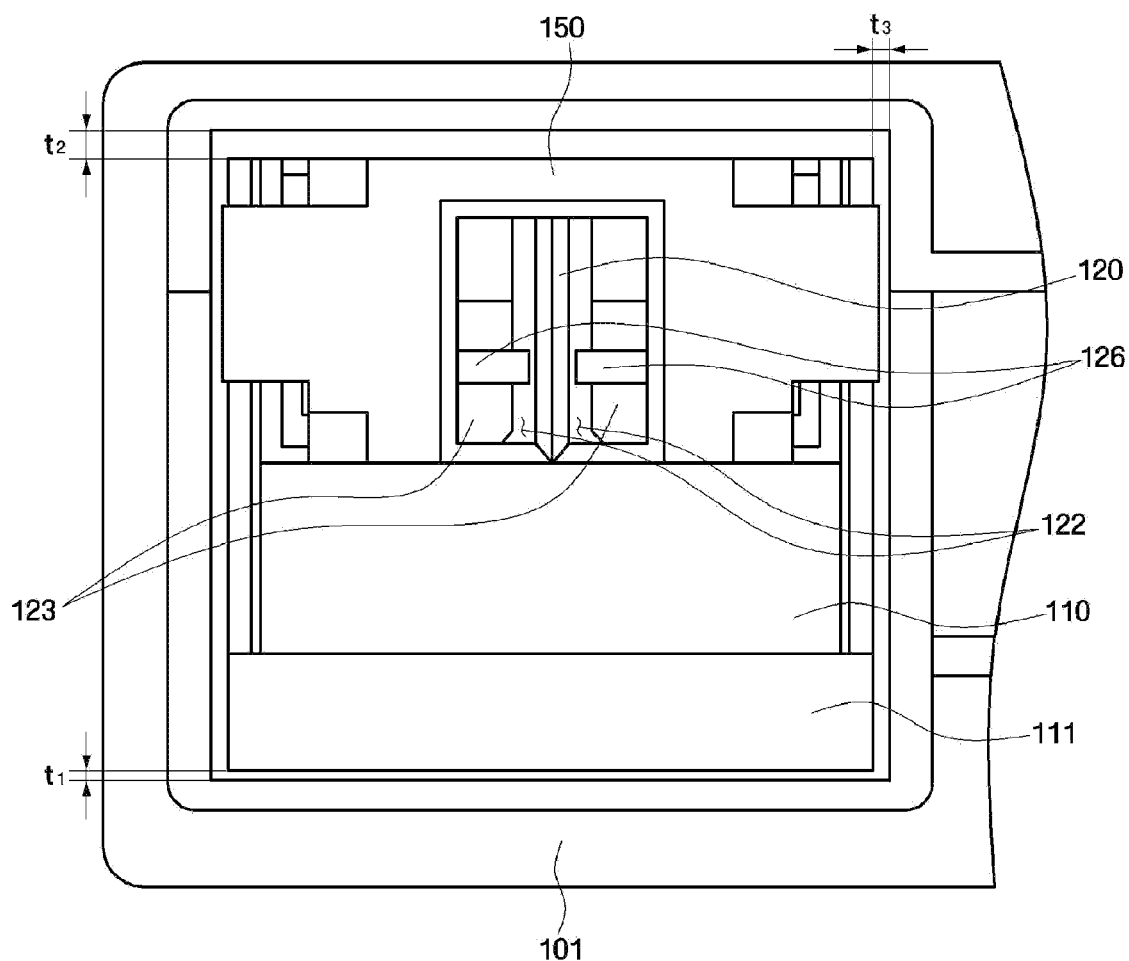
FIG. 9 is a plan view of the lamp socket and the alignment plate of the LCD according to the exemplary embodiment of the present invention shown in FIG. 1.

Still referring to FIG. 2, the guide member 120 guides the lamp terminals 71 (FIG. 1) of the lamp 70 into the lamp terminal insertion grooves 122 (FIG. 9). Thus, the guide member 120 separates and/or insulates the lamp terminals 71 of the lamp 70 from each other, and also allows the lamp terminals 71 to be easily inserted into the lamp terminal insertion grooves 122.

The guide member 120 is formed between support walls 123 supporting the first connection terminals 126 (FIG. 9). When the guide member 120 is inserted into the lamp 70 by means of automated equipment, the lamp terminals 71 are first guided by the guide member 120, and the lamp terminals 71 are sequentially inserted into the lamp terminal insertion grooves 122.

As shown in FIG. 2, the guide member 120 has sloping surfaces extending along from a corner of an upper portion of the guide member 120. Specifically, the sloping surfaces are inclined at a predetermined angle relative to a longitudinal axis of the guide member 120. The predetermined angle facilitates insertion of the terminals of the lamp 70 when the lamp 70 is inserted into the lamp socket 100.

Thus, the lamp terminals 71 of the lamp 70 are coupled between the first connection terminals 126 and the guide member 120, thereby fixing the lamp 70 and the lamp socket 100 and thereby preventing the lamp 70 from moving in the lamp socket 100.

The cover 150 includes the opening 152, and it is thereby possible to easily visually check whether the lamp terminals 71 are accurately inserted into the lamp terminal insertion grooves 122. More specifically, the cover 150 is configured such that the opening 152 is shaped in a channel cut in a direction substantially the same as a direction in which the lamp 70 is positioned into the guide member 120. Further, the lamp terminal insertion grooves 122 are partially exposed through the opening 152, thereby allowing a user to easily verify whether the lamp terminals 71 are accurately inserted into the lamp terminal insertion grooves 122.

In an exemplary embodiment, the opening 152 is formed to partially expose a portion of the lamp terminals 71. More particularly, the opening 152 has a size sufficient to determine whether the lamp terminals 71 are accurately inserted into the lamp socket 100.

In an exemplary embodiment, a remaining area of the cover 150, e.g., an area of the cover 150 which is not the opening 152, covers a corner of each of the lamp terminals 71 to thereby effectively prevent the lamp 70 from moving within lamp socket 100.

Meanwhile, the opening 152 is not necessarily opened in a direction in which the lamp 70 is positioned. In addition, the opening 152 may be a closed area opened so as to expose the lamp terminals 71.

Figure 3:
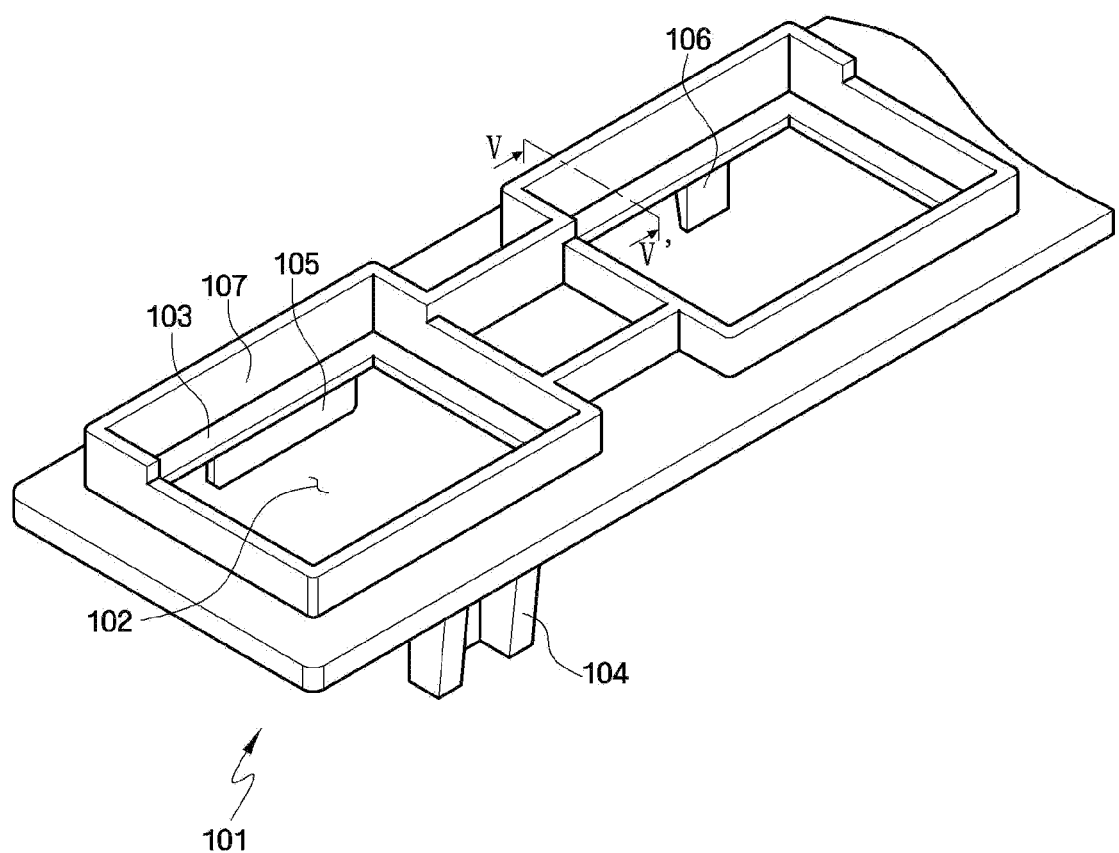
FIG. 3 is a perspective view of an alignment plate of the LCD according to the exemplary embodiment of the present invention shown in FIG. 1.
Figure 4:
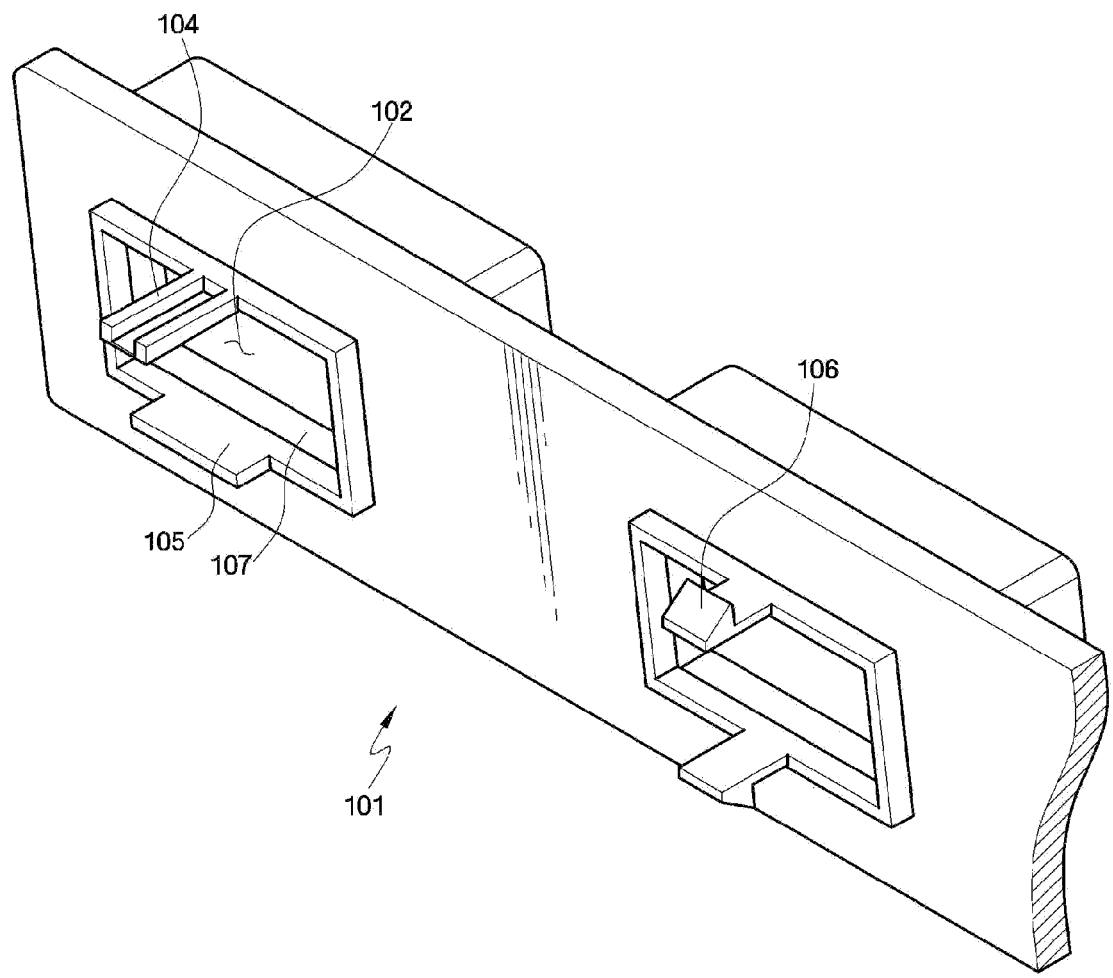
FIG. 4 is a bottom perspective view of the alignment plate of the LCD according to the exemplary embodiment of the present invention shown in FIG. 1.
Figure 5:
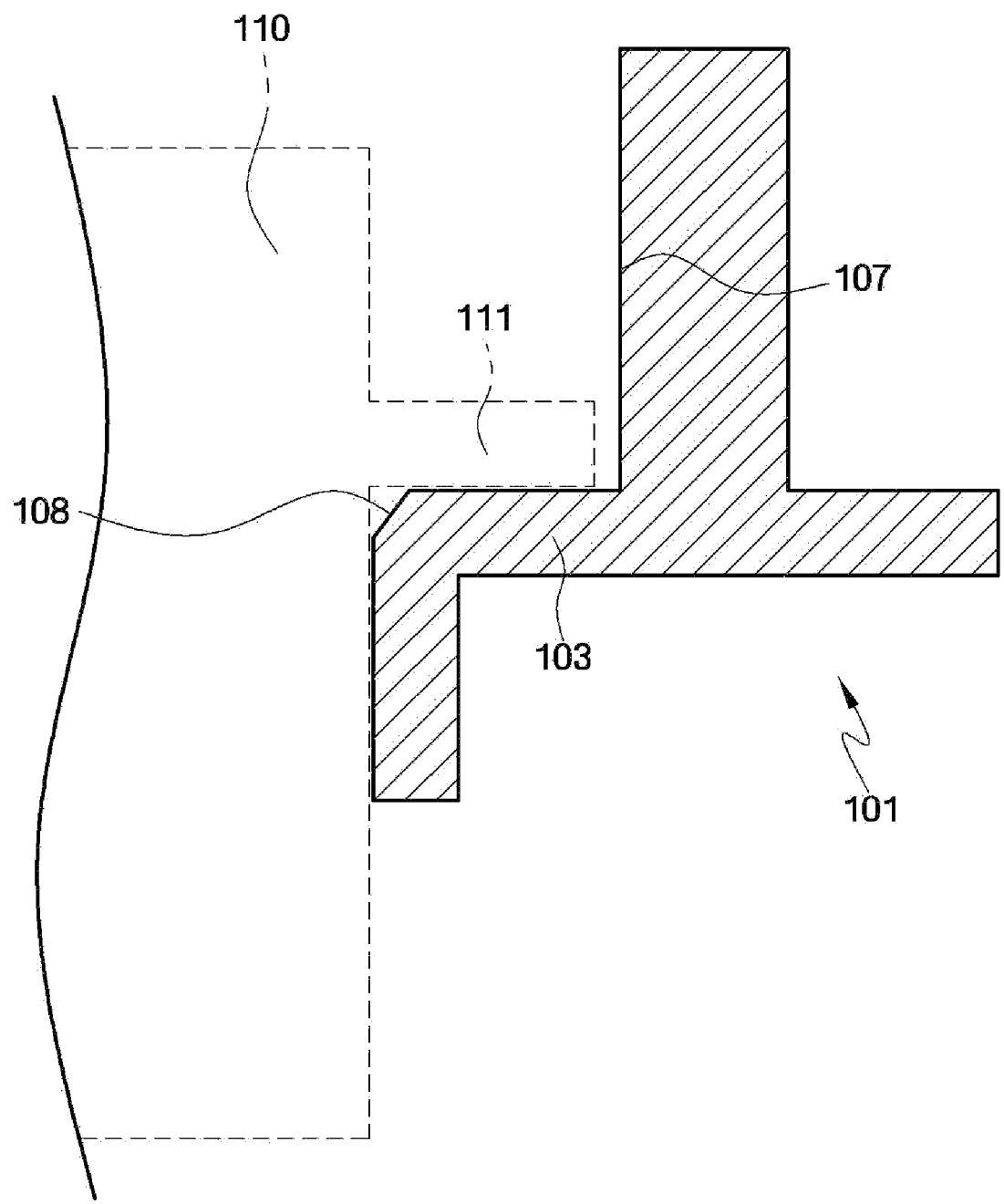
FIG. 5 is a partial cross-sectional view taken along line V-V' of FIG. 3.

Hereinafter, the lamp socket 100 and the alignment plate 101 included in the LCD 1 according to an exemplary embodiment of the present invention will be described in detail with reference to FIGS. 1 and 3 through 5. FIG. 3 is a perspective view of an alignment plate of the LCD according to the exemplary embodiment of the present invention shown in FIG. 1, FIG. 4 is a bottom perspective view of the alignment plate of the LCD according to the exemplary embodiment of the present invention shown in FIG. 1, and FIG. 5 is a partial cross-sectional taken along line V-V' of FIG. 3.

The alignment plate 101 is coupled to, e.g., is connected to, the lamp socket 100 having the lamp 70 inserted thereinto, and thereby fixes the lamp socket 100 to the lower receiving container 90. The alignment plate 101 includes socket insertion holes 102, a seating portion 103, a first guide portion 104, a second guide portion 105 and a stopper hook 106.

In an exemplary embodiment, the alignment plate 101 includes a plurality of the socket insertion holes 102 to securely fix a plurality of the lamp sockets 100. The socket insertion holes 102 are formed substantially in parallel to each other and are aligned along a longitudinal direction of the alignment plate 101. Further, the socket insertion holes 102 are formed to correspond to a size of the housing 110 so that the lamp sockets 100 may be inserted into the socket insertion holes 102. Thus, since four peripheral sides of the socket insertion holes 102 are surrounded by corresponding sidewalls 107, the flange 111 (FIG. 2) of each of the lamp sockets 100 supports the lamp socket 100. Further, the seating portion 103 on which the lamp socket 100 is seated is formed at an interior area formed by the sidewalls 107, as shown in FIG. 4.

Thus, the flange 111 of the lamp socket 100 is seated on the seating portion 103, which securely fixes the lamp socket 100 to the alignment plate 101. Since the seating portion 103 protrudes toward an interior area of the lamp socket 100 formed by the sidewalls 107, and the flange 111 of the lamp socket 100 protrudes toward an outside area of the housing 110, the flange 111 of the lamp socket 100 and the seating portion 103 of the alignment plate 101 overlap each other by a predetermined area. As described above, at least a portion of the flange 111 overlaps with the seating portion 103, and the light emitted from the lamp 70 is thereby effectively prevented from leaking outside the lower receiving container 90. In addition, foreign materials are effectively prevented from being introduced into the lower receiving container 90.

As described above, the flange 111 of the lamp socket 100 is fixed to the seating portion 103 of the alignment plate 101, and the housing 110 positioned below the flange 111 of the lamp socket 100 which protrudes outside the alignment plate 101. As a result, movement of the lamp socket 100 may occur during a connecting process of the lamp socket 100 and the alignment plate 101. To prevent the movement which may occur between the lamp socket 100 and alignment plate 101, the first guide portion 104 and the second guide portion 105 are provided. The first guide portion 104 (FIG. 3) and the second guide portion 105 (FIG. 3) for preventing the lamp sockets 100 from fluctuating are formed below the seating portion 103.

Specifically, the first guide portion 104 is positioned substantially adjacent to the socket insertion hole 102, and is formed below the seating portion 103, as shown in FIG. 3. More specifically, the first guide portion 104 protrudes downward with respect to the seating portion 103. In addition, the first guide portion 104 is formed directly below the seating portion 103 and protrudes substantially downward away from the alignment plate 101, to contact sides of the lamp socket 100 inserted into the socket insertion hole 102.

Likewise, as described above with reference to the first guide portion 104, the second guide portion 105 is positioned substantially adjacent to the socket insertion hole 102, and is formed below the seating portion 103. Thus, the second guide portion 105 also protrudes downward with respect to the seating portion 103. The second guide portion 105 is also disposed opposite to the first guide portion 104. The second guide portion 105 is formed to contact the sides of the lamp socket 100 inserted into the socket insertion hole 102. Thus, the first guide portion 104 and the second guide portion 105 are both formed to contact the housing 110 with the lamp socket 100 interposed therebetween, thereby effectively preventing the lamp socket 100 from moving away from the alignment plate 101.

In an exemplary embodiment, the first guide portion 104 may be longer than the second guide portion 105, e.g., the first guide portion 104 may extend further in the downward direction than the second guide portion 105. Further, a width of the second guide portion 105 may be greater than a width of the first guide portion 104. It will be noted the sizes, locations, and/or shapes of the first guide portion 104 and the second guide portion 105 according to an alternative exemplary embodiment may be different than as in the foregoing description of the exemplary embodiment of the present invention shown in FIG. 3. For example, in an alternative exemplary embodiment, the second guide portion 105 may be longer than the first guide portion 104, and/or a width of the first guide portion 104 may be greater than a width of the second guide portion 105.

The socket insertion hole 102 disposed substantially adjacent to the socket insertion hole 102 having the first guide portion 104 and the second guide portion 105 formed therein may include a stopper hook 106.

In an exemplary embodiment, the stopper hook 106 combines the alignment plate 101 to the lower receiving container 90 by hook coupling to thereby securely fix the alignment plate 101 to the lower receiving container 90. Specifically, the stopper hook 106 is positioned substantially adjacent to the socket insertion hole 102, and is formed below the seating portion 103, as shown in FIG. 3. The stopper hook 106 is disposed opposite to, e.g., facing, the socket insertion hole 102, and the first guide portion 104 and the second guide portion 105 may be formed at a same position opposite the stopper hook 106. Thus, a pair of the stopper hooks 106 may be formed at the same position as the first guide portion 104 and the second guide portion 105 to effectively prevent a position of the lamp socket 100 from fluctuating within the socket insertion hole 102 of the alignment plate 101.

Still referring to FIG. 3, the first guide portion 104, the second guide portion 105, and the pair of stopper hooks 106 (only one stopper hook shown in FIG. 3) may be alternately formed at every socket insertion hole 102 of the alignment plate 101. Put another way, the stopper hooks 106 according to an alternative exemplary embodiment of the present invention may not be formed at all of the socket insertion holes 102. In an exemplary embodiment, the stopper hooks 106 may be spaced apart from each other by a predetermined distance. Further, the first guide portion 104 and the second guide portion 105 may be formed at a corresponding socket insertion hole 102 at which the stopper hook 106 is not formed. However, the aforementioned arrangement of the first guide portion 104, the second guide portion 105 and the stopper hooks 106 is provided for purposes of illustration only, and in alternative exemplary embodiments of the present invention, various arrangement manners of the first guide portion 104, the second guide portion 105 and the stopper hooks 106 may be utilized, based on consideration of a size of the lamp socket 100 and/or a length of the alignment plate 101.

Referring now to FIG. 5, a sloping plane 108 is formed at a corner of the seating portion 103 at an interior portion thereof defined by the sidewalls 107, e.g., at an interior portion between the housing 110 and the seating portion 103 of the alignment plate 101. The sloping plane 108 formed at the seating portion 103 allows the housing 110 of the lamp socket 100 to be easily inserted into the socket insertion hole 102. Specifically, when the lamp socket 100 is inserted into the alignment plate 101 by means of automated equipment, it is necessary to accurately align the lamp socket 100 and the alignment plate 101. Accordingly, the sloping plane 108 is formed at the corner of the seating portion 103, thereby facilitating automated insertion of the lamp socket 100 into the socket insertion hole 102.

Figure 6:
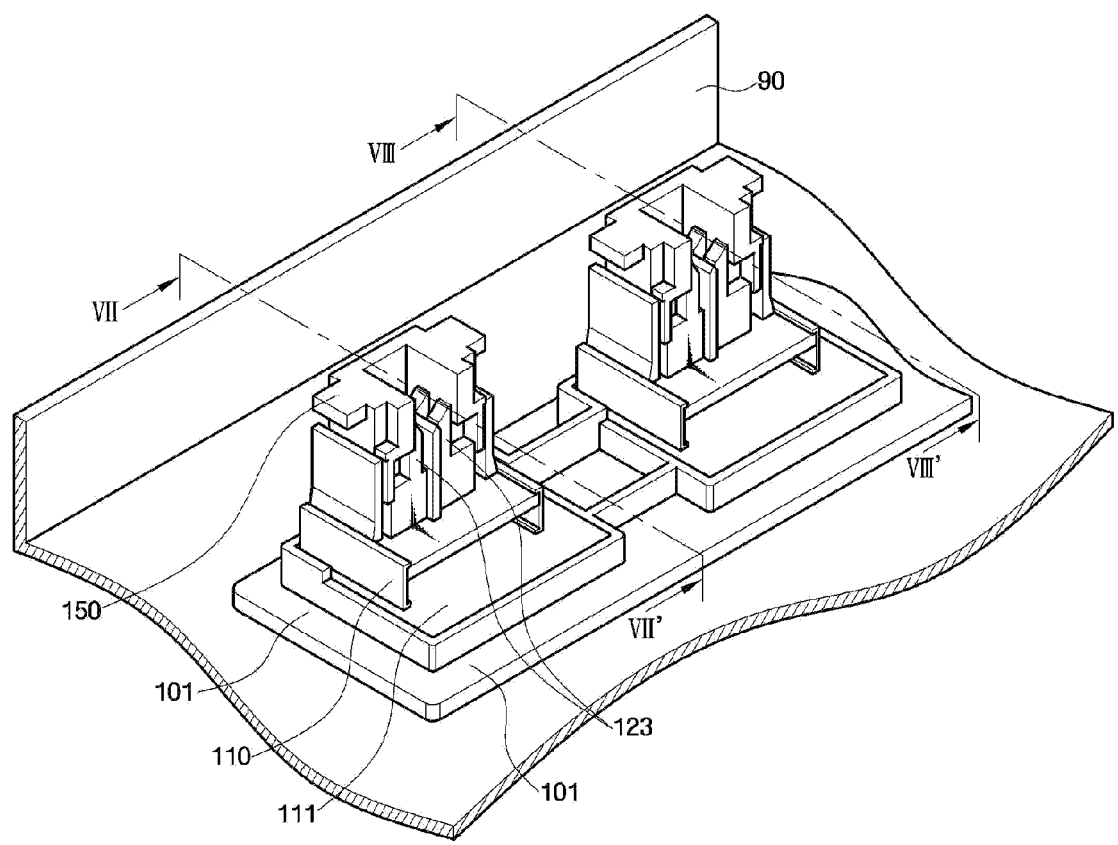
FIG. 6 is a perspective view illustrating the lamp socket, the alignment plate and a lower receiving container of the LCD according to the exemplary embodiment of the present invention shown in FIG. 1.
Figure 8:
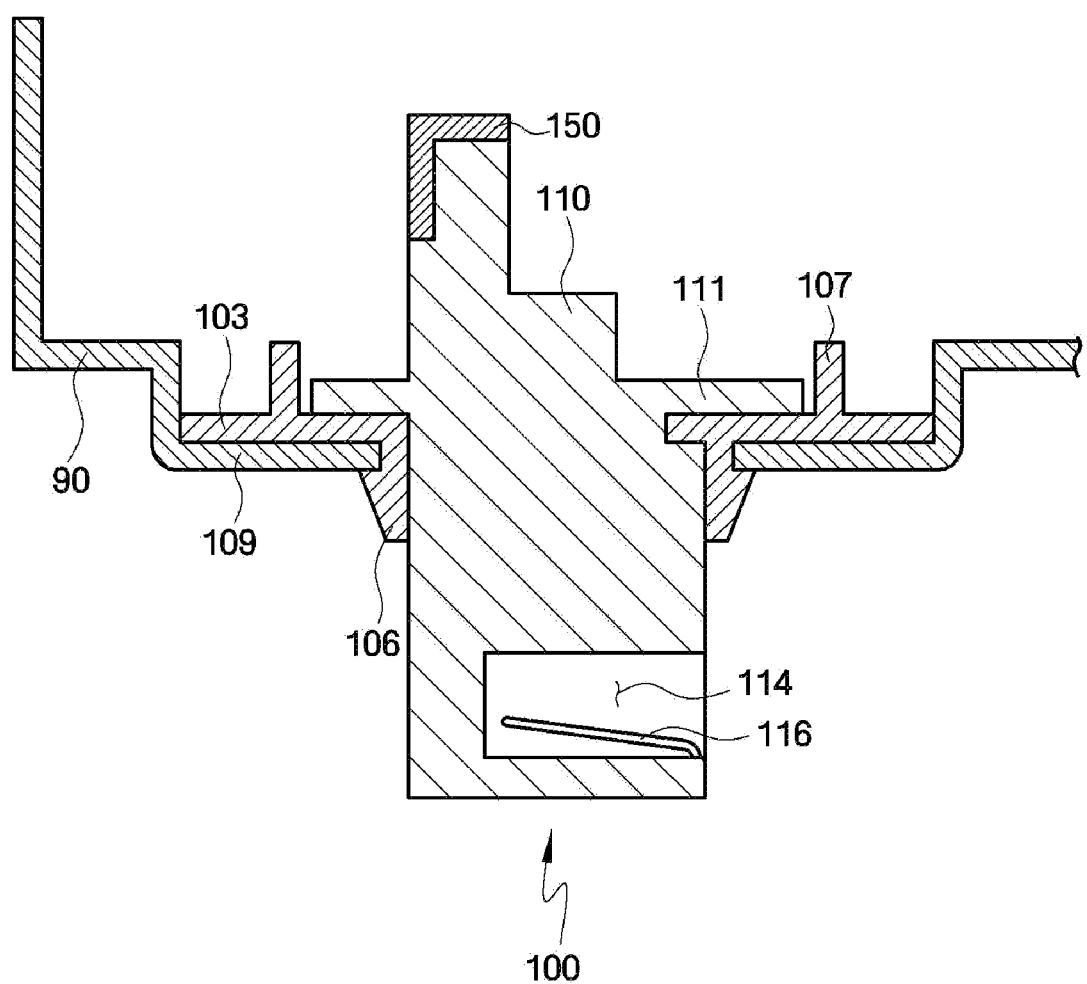
FIG. 8 is a partial cross-sectional taken along line VIII-VIII' of FIG. 6.

Hereinafter, the lamp socket 100, the alignment plate 101, and the lower receiving container 90 included in the LCD 1 according to an exemplary embodiment of the present invention will be described in further detail with reference to FIGS. 1 and 6 through 9. FIG. 6 is a perspective view of the lamp socket, the alignment plate and a lower receiving container of the LCD according to the exemplary embodiment of the present invention shown in FIG. 1, FIG. 7 is a partial cross-sectional view taken along line VII-VII' of FIG. 6, FIG. 8 is a partial cross-sectional view taken along line VIII-VIII' of FIG. 6, and FIG. 9 is a plan view of the lamp socket and the alignment plate of the LCD according to the exemplary embodiment of the present invention shown in FIG. 1.

The lamp socket 100 is inserted into the socket insertion hole 102 of the alignment plate 101 to thereby be fixed in the socket insertion hole 102. Further, the alignment plate 101 is fixed to the recess portion 109 such that an end of the lamp socket 100 penetrates through the lower receiving container 90 outside, e.g., external to, the lower receiving container 90. As described in greater detail above, the recess portion 109 is formed on the bottom surface of the lower receiving container 90 and has the cutout portion 91. In addition the recess portion 109 according to an exemplary embodiment is connected to the alignment plate 101 by hook coupling, for example.

The end of the lamp socket 100 where the inverter insertion hole 114 is formed (and where the second connection terminals 116 are positioned), is exposed to the outside through the alignment plate 101 and the cutout portion 91. Thus, in the LCD 1 according to an exemplary embodiment, the second connection terminals 116 function as heat dissipation pins exposed to the outside, and heat generated from the lamp socket 100 is thereby effectively dissipated.

In addition, the first guide portion 104 and the second guide portion 105 are positioned substantially adjacent to the housing 110 of the lamp socket 100, thereby preventing fluctuation of a position of the lamp socket 100 in the alignment plate 101.

Since the stopper hook 106 of the alignment plate 101 is inserted substantially perpendicularly into, and thereby combined with, the cutout portion 91, a separate fastening means (such as a screw, for example) is not required, thereby substantially simplifying an assembling process and thereby further facilitating automated assembling of the LCD 1 according to an exemplary embodiment of the present invention.

During operation, the lamp 70 generates heat as well as the light. The heat generated from the lamp 70 is transferred to the lamp socket 100. As a result, the lamp socket 100 may expand due to the heat, causing increased friction to develop between the lamp socket 100 and the alignment plate 101. In this case, noise is generated due to the friction between the lamp socket 100 and the alignment plate 101. To substantially reduce the noise, the flange 111 of the lamp socket 100 according to an exemplary embodiment is spaced apart from the inner surface of the socket insertion hole 102 of the alignment plate 101. Further, gaps having predetermined intervals $t_1$, $t_2$, and $t_3$ are formed between the flange 111 and the sidewalls 107. However, the gaps having the predetermined intervals $t_1$, $t_2$, and $t_3$ between the flange 111 and the sidewalls 107 may cause fluctuation of a position of the lamp socket 100, but the fluctuation is effectively prevented in the LCD 1 according to an exemplary embodiment of the present invention by the first guide portion 104, the second guide portion 105 and/or the stopper hook 106, as described above. In an exemplary embodiment, the predetermined intervals $t_1$, $t_2$, and $t_3$ between the flange 111 and the sidewalls 107 are not uniformly. Instead, the predetermined intervals $t_1$, $t_2$, and $t_3$ of the gaps between the flange 111 and the sidewalls 107 may be adjusted based several factors, such as a thermal expansion ratio of the lamp socket 100 to the alignment plate 101, for example.

Hereinafter, a method of manufacturing an LCD according to an exemplary embodiment of the present invention will be described in further detail with reference to FIGS. 10A through 10E. FIGS. 10A through 10E are partial cross-sectional views illustrating a method of manufacturing an LCD according to an exemplary embodiment of the present invention. The same reference characters in FIGS. 10A through 10E denote the same or like components as described above in greater detail with reference to FIGS. 1 through 9, and any repetitive detailed description thereof will hereinafter be omitted.

Figure 10A:
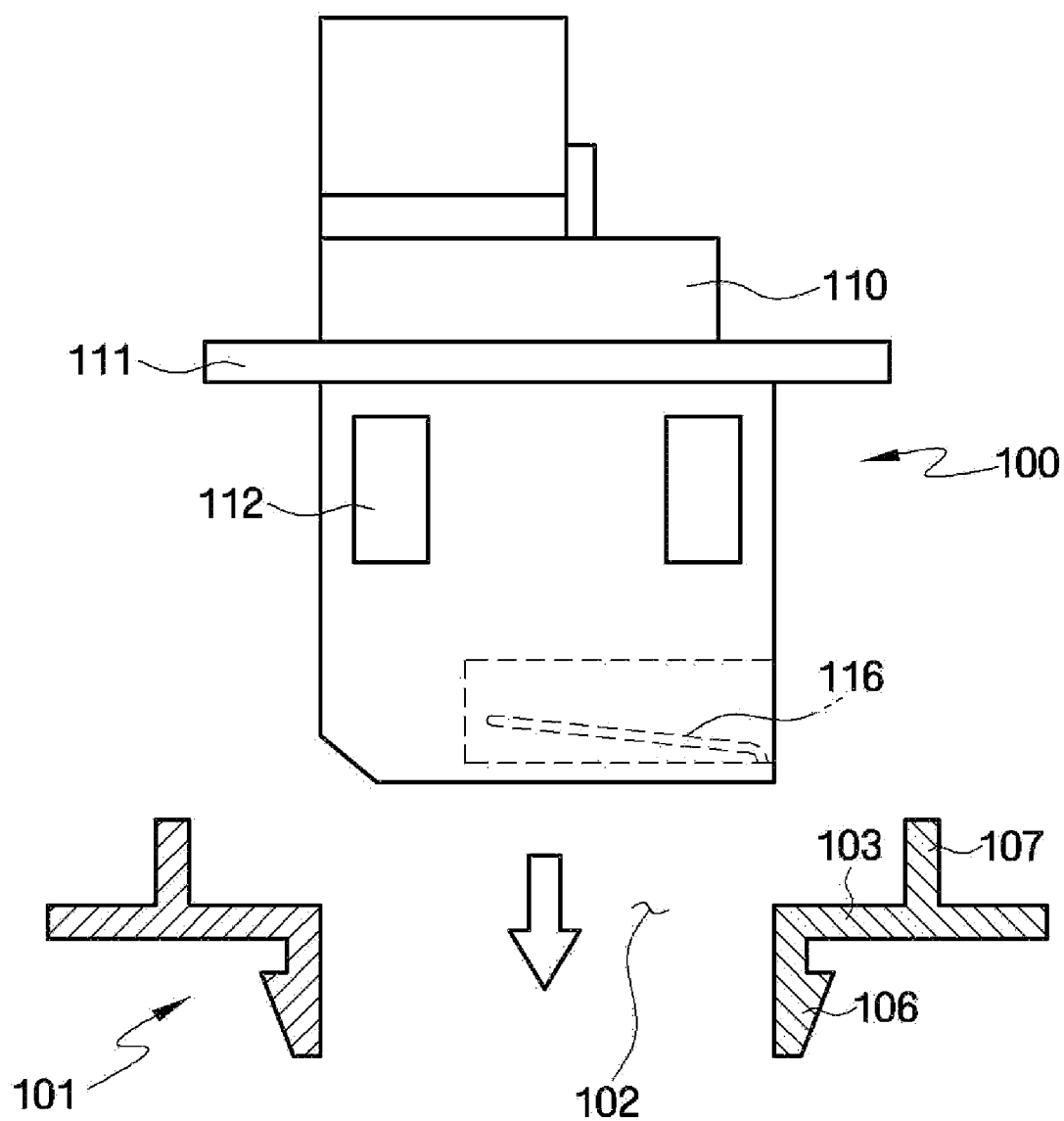
FIGS. 10A through 10E are partial cross-sectional views illustrating a method of manufacturing an LCD according to an exemplary embodiment of the present invention.

Referring to FIG. 10A, the lamp socket 100 having the cover 150 (FIG. 2) removed therefrom, e.g., not yet attached thereto, is inserted into the alignment plate 101. The lamp socket 100 is combined to the alignment plate 101 through the socket fixing portion 112 by hook coupling, and the lamp socket 100 is thereby inserted into the socket insertion hole 102 of the alignment plate 101. At the same time, the lamp socket 100 and the alignment plate 101 are securely fixed to each other. Thus, since the lamp socket 100 is inserted into and combined with, e.g., connected to, the socket insertion hole 102, an automated assembling process by means of automated equipment is facilitated in the LCD 1 according to an exemplary embodiment.

Figure 10B:
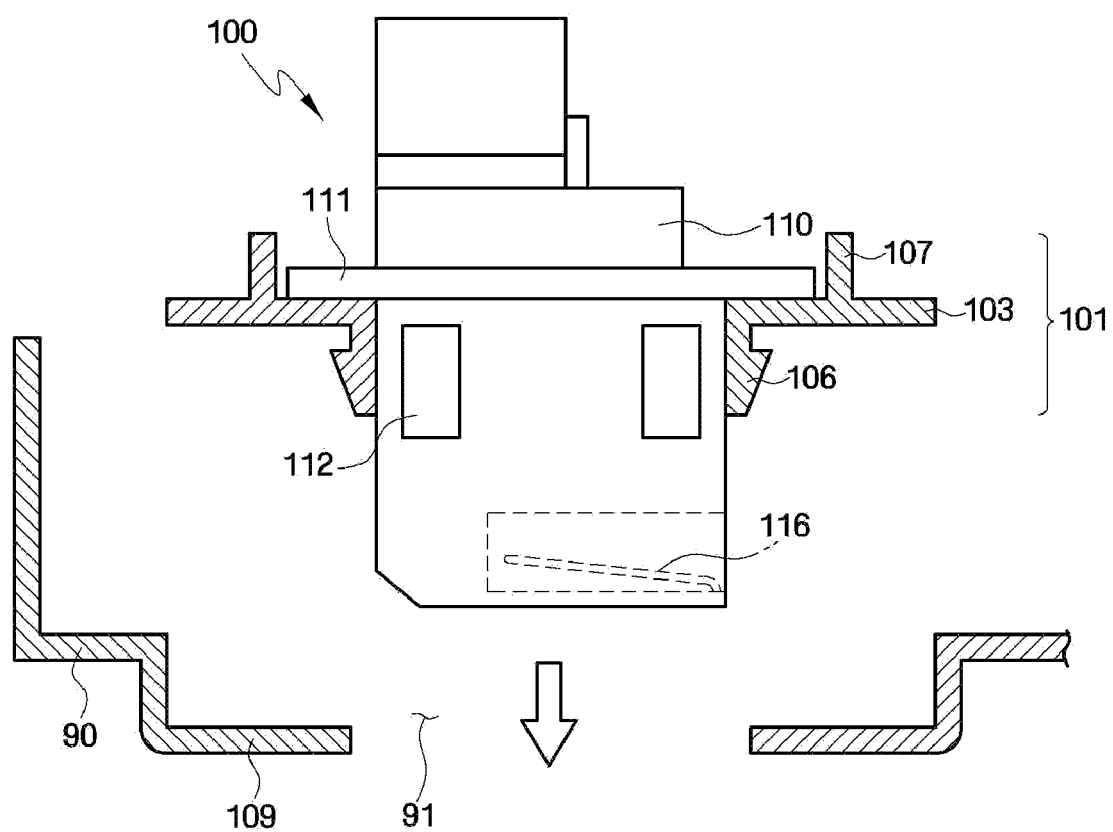

Referring now to FIG. 10B, the alignment plate 101 having the lamp socket 100 inserted thereinto is then combined with, e.g., connected to the lower receiving container 90. The alignment plate 101 includes the stopper hook 106 at a lower portion thereof, and is combined with, e.g., connected to, the lower receiving container 90 by hook coupling, as described in greater detail above. Accordingly, when the alignment plate 101 is downwardly placed into the cutout portion 91 to be perpendicularly inserted into the lower receiving container 90, the alignment plate 101 is combined with, e.g., coupled to, the lower receiving container 90. As above, the assembling process of the lamp socket 100 is easily automated to combine the alignment plate 101 to the lower receiving container 90 by hook coupling according to an exemplary embodiment of the present invention.

Figure 10C:
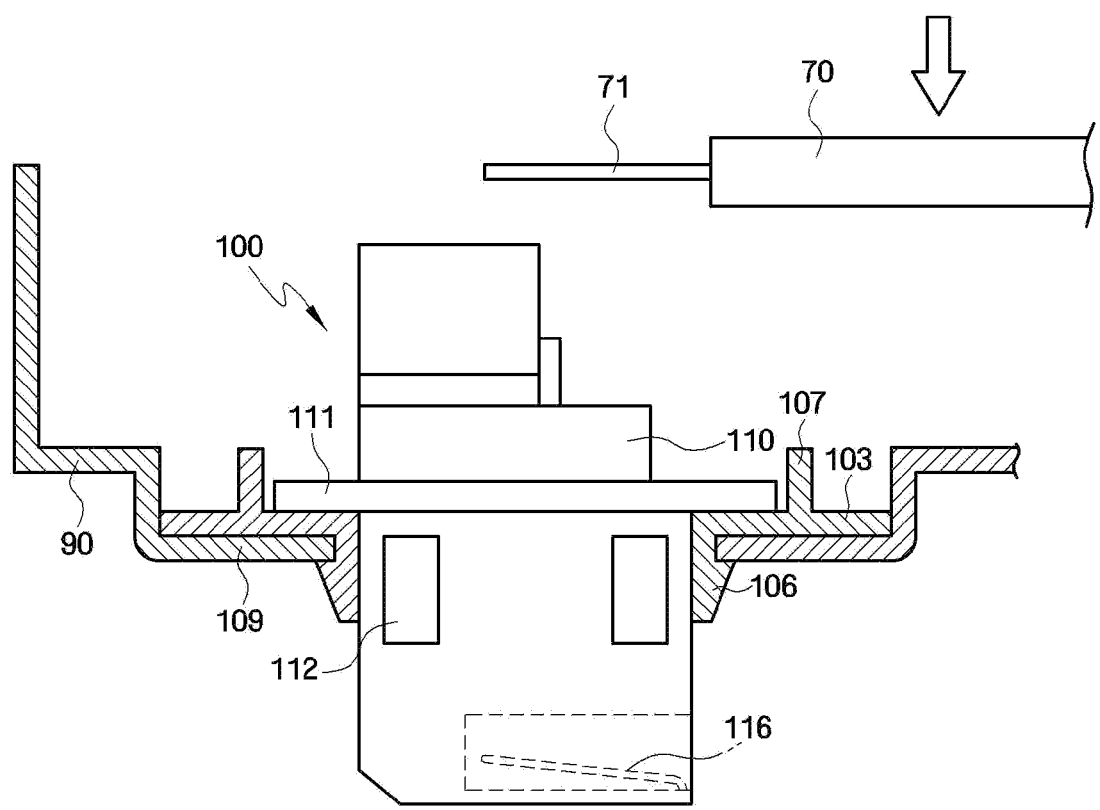

Referring to FIG. 10C, the lamp 70 is downwardly placed on, and thereafter perpendicularly inserted into, the lamp socket 100. As described above with reference to FIG. 1, a plurality of the lamps 70 can thereby be simultaneously inserted into a plurality of lamp sockets 100, and an assembling process time according to an exemplary embodiment is therefore effectively decreased.

Figure 10D:
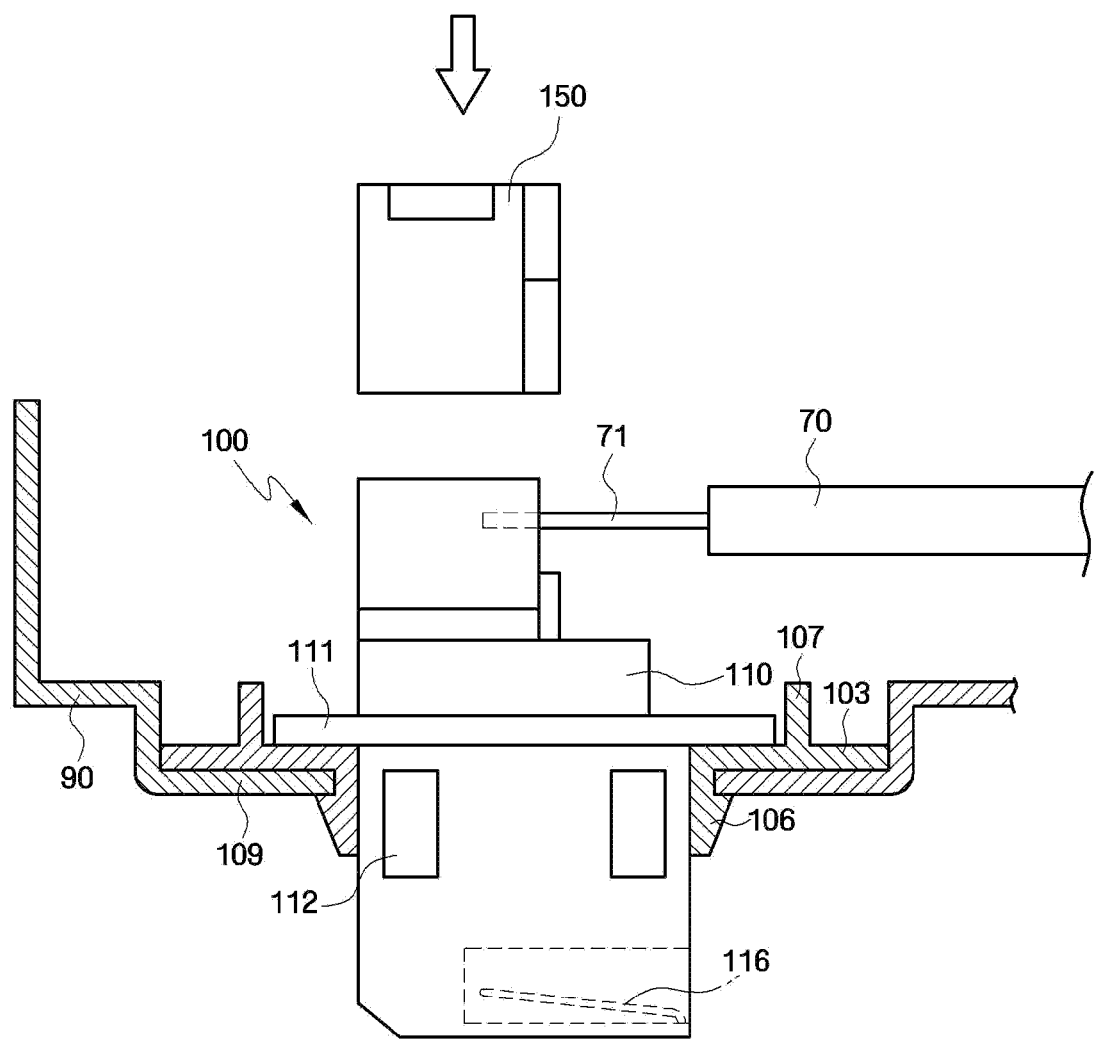

Referring now to FIG. 10D, the cover 150 is combined with, e.g., is connected to, the lamp socket 100 after the lamp 70 is inserted into the lamp socket 100. As described above, the cover 150 effectively prevents a position of the lamp 70 from deviating within the lamp socket 100. In addition, the cover 150 can be combined to cover a plurality of the lamp sockets 100. Thus, in an exemplary embodiment having the HCFLs as the lamps 70, since the lamp terminals 71 are provided at opposite ends of the lamps 70, after inserting the lamps 70 into the lamp sockets 100, the cover 150 is attached to the lamp-lamp socket structure, thereby preventing a fluctuation of a position of the lamps 70 and the lamp sockets 100.

In an exemplary embodiment, the cover 150 may be formed separately from the lamp socket 100 to then be coupled thereto. However, a formation of the cover 150 is not limited to the exemplary embodiments described herein, and the cover 150 may alternatively be coupled using a hinge, for example, to the lamp socket 100.

Figure 10E:
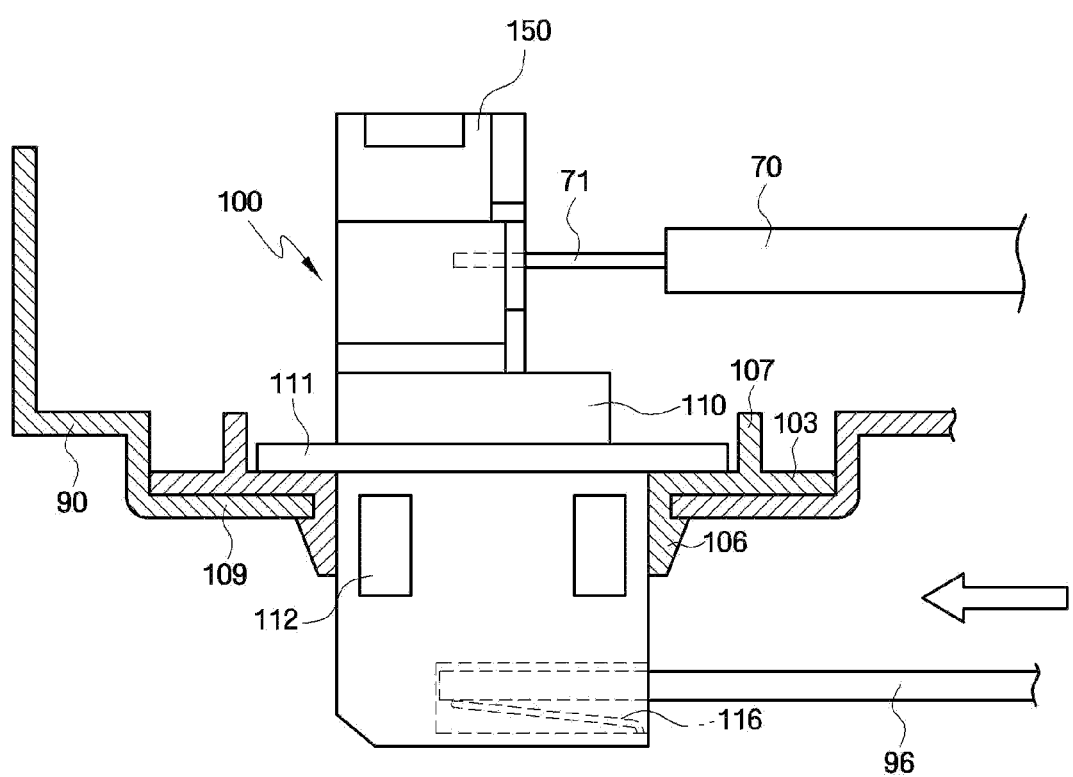

Referring now to FIG. 10E, the inverter 96 is next inserted into the portion the lamp socket 100 which is exposed to the outside of the lower receiving container 90 of the LCD 1. After inserting the inverter 96 into the lamp socket 100, correct insertion of the inverter 96 and the lamp 70 are verified by a user looking through the opening 152. Specifically, the user checks whether the lamp 70 has accurately been inserted into the lamp socket 100 using the opening 152 formed on the upper surface of the cover 150, as best shown in FIG. 2.

Thus, according to exemplary embodiments of the present invention as described herein, an LCD has advantages which include, but are not limited to, a lamp socket with substantially improved heat dissipation capability, an effectively simplified assembling process thereof, and substantially reduced noise from friction.

The present invention should not be construed as being limited to the exemplary embodiments set forth herein. Rather, these exemplary embodiments are provided so that this disclosure will be thorough and complete and will fully convey the concept of the present invention to those skilled in the art. Exemplary embodiments of the present invention are therefore considered in all respects as illustrative and not restrictive.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A backlight assembly comprising:
a lamp which generates light;
a lamp socket which receives the lamp;
an alignment plate comprising a socket insertion hole formed therethrough to receive the lamp socket; and
a receiving container comprising a cutout portion formed therethrough to receive the alignment plate by moving the lamp socket in a direction which is not parallel to the alignment plate, wherein
the receiving container receives the alignment plate having the lamp socket inserted through the socket insertion hole, and
a portion of the lamp socket is exposed outside the receiving container through the socket insertion hole when the receiving container receives the alignment plate.

2. The backlight assembly of claim 1, wherein the receiving container further comprises a recess portion formed on a bottom surface thereof, wherein
the recess portion extends downward away from the lamp, and
the alignment plate is disposed in the recess portion.

3. The backlight assembly claim 1, wherein the alignment plate and the receiving container are coupled to each other by hook coupling.

4. The backlight assembly claim 3, wherein the alignment plate further comprises a stopper hook which extends through the cutout portion of the receiving container to attach the alignment plate to the receiving container.

5. The backlight assembly claim 1, wherein the alignment plate further comprises a guide portion, wherein the guide portion extends from the alignment plate through the cutout portion of the receiving container and contacts the lamp socket received through the cutout portion to prevent movement of the lamp socket.

6. The backlight assembly claim 1, wherein
the alignment plate further comprises a seating portion formed along a periphery of the socket insertion hole, and
the lamp socket is seated on the seating portion when the receiving container is attached to the alignment plate.

7. The backlight assembly claim 6, wherein the lamp socket comprises:
a housing; and
a flange protruding from a side of the housing, wherein a portion of the flange at least partially overlaps a portion of the seating portion.

8. The backlight assembly claim 7, wherein
the alignment plate further comprises a sidewall extending upward toward the lamp and disposed around the periphery of the socket insertion hole, and
the flange is separated from the sidewall by a predetermined distance when the receiving container is attached to the alignment plate.

9. The backlight assembly claim 1, wherein
the alignment plate further comprises:
a plurality of the socket insertion holes; and
a guide portion and a stopper hook alternately disposed in each socket insertion hole of the plurality of socket insertions holes, and
the guide portion and the stopper hook each extend from the alignment plate through the cutout portion of the receiving container and contact the lamp socket to prevent movement of the lamp socket.

10. A liquid crystal display comprising:
a liquid crystal display panel which displays an image;
a lamp which supplies the liquid crystal display panel with light;
a lamp socket which receives the lamp;
an alignment plate comprising a socket insertion hole formed therethrough to receive the lamp socket by moving the lamp socket in a direction which is not parallel to the alignment plate; and
a receiving container comprising a cutout portion formed therethrough to receive the alignment plate, wherein
the receiving container receives the alignment plate having the lamp socket inserted through the socket insertion hole, and
a portion of the lamp socket is exposed outside the receiving container through the socket insertion hole when the receiving container receives the alignment plate.

11. The liquid crystal display of claim 10, wherein the receiving container further comprises a recess portion formed on a bottom surface thereof, wherein
the recess portion extends downward away from the lamp, and
the alignment plate is disposed in the recess portion.

12. The liquid crystal display of claim 10, wherein the alignment plate and the receiving container are coupled each other by hook coupling.

13. The liquid crystal display of claim 12, wherein the alignment plate further comprises a stopper hook which extends through the cutout portion of the receiving container to attach the alignment plate to the receiving container.

14. The liquid crystal display of claim 10, wherein the alignment plate further comprises a guide portion, wherein the guide portion extends from the alignment plate through the cutout portion of the receiving container and contacts the lamp socket received through the cutout portion to prevent movement of the lamp socket.

15. The liquid crystal display of claim 10, wherein
the alignment plate further comprises a seating portion formed along a periphery of the socket insertion hole, and
the lamp socket is seated on the seating portion when the receiving container is attached to the alignment plate.

16. The liquid crystal display of claim 15, wherein the lamp socket comprises:
a housing; and
a flange protruding from a side of the housing, wherein a portion of the flange at least partially overlaps a portion of the seating portion.

17. The liquid crystal display of claim 16, wherein
the alignment plate further comprises a sidewall extending upward toward the lamp and disposed around the periphery of the socket insertion hole, and
the flange is separated from the sidewall by a predetermined distance when the receiving container is attached to the alignment plate.

18. The liquid crystal display of claim 10, wherein
the alignment plate further comprises:
a plurality of the socket insertion holes; and
a guide portion and a stopper hook alternately disposed in each socket insertion hole of the plurality of socket insertion holes, and
the guide portion and the stopper hook each extend from the alignment plate through the cutout portion of the receiving container and contact the lamp socket to prevent movement of the lamp socket.

19. The liquid crystal display of claim 10, further comprising an inverter attached to the portion of the lamp socket exposed outside the receiving container through the cutout portion to apply a driving voltage to the lamp.

20. The liquid crystal display of claim 19, wherein the inverter is connected to the lamp socket outside the receiving container.

21. A method of manufacturing a liquid crystal display comprising:
   attaching a lamp socket to an alignment plate, the alignment plate comprising a socket insertion hole formed therethrough to receive the lamp socket by moving the lamp socket in a direction which is not parallel to the alignment plate; and
   attaching the alignment plate having the lamp socket attached thereto to a receiving container, the receiving container comprising a cutout portion formed therethrough to receive the alignment plate,
   wherein a portion of the lamp socket is exposed outside the receiving container through the socket insertion hole when the receiving container is attached to the alignment plate.

22. The method of claim 21, further comprising attaching a cover to the lamp socket.

23. The method of claim 21, further comprising attaching an inverter to the portion of the lamp socket exposed through the cutout portion.

24. The method of claim 21, wherein the alignment plate and the receiving container are attached to each other by hook coupling.

* * * * *